United States Patent [19]
Hodgdon

[11] Patent Number: 5,510,394
[45] Date of Patent: Apr. 23, 1996

[54] HIGH IONIC CONDUCTANCE ION EXCHANGE MEMBRANES AND THEIR PREPARATION

[75] Inventor: Russell B. Hodgdon, Harwich, Mass.

[73] Assignee: Ionics Incorporated, Watertown, Mass.

[21] Appl. No.: 355,935

[22] Filed: Dec. 14, 1994

Related U.S. Application Data

[63] Continuation-in-part of Ser. No. 29,491, Mar. 11, 1993, abandoned, which is a continuation-in-part of Ser. No. 656,382, Feb. 19, 1991, abandoned.

[51] Int. Cl.$^6$ ............................................. C08J 5/22
[52] U.S. Cl. ............... 521/27; 210/500.27; 210/500.35; 210/500.42; 210/500.43; 521/30; 521/38
[58] Field of Search ............................... 521/27; 204/296

[56] References Cited

U.S. PATENT DOCUMENTS

| | | | |
|---|---|---|---|
| 3,647,086 | 3/1972 | Mizutani | 210/22 |
| 5,118,717 | 6/1992 | Hodgdon | 521/38 |
| 5,264,125 | 11/1993 | MacDonald | 210/500.35 |

*Primary Examiner*—Fred Zitomer
*Attorney, Agent, or Firm*—Norman E. Saliba

[57] ABSTRACT

It has been discovered (Examples 4, 11 and 17) that certain desirable films will not absorb a sufficient amount of certain desirable, polymerizable monomers as to result in interpolymer membranes having desirable ion exchange properties after polymerization of any absorbed such monomers and after any subsequent conversion of such absorbed and polymerized monomers into ionizable moieties. It has also been discovered that if a predetermined amount of plasticizer, extractable by such monomers, is incorporated into such films, then the latter will absorb a sufficient amount of such monomers as to result (after polymerization of such monomers) in interpolymer membranes having desirable ion exchange properties. Examples of preferred monomers include the polar (meth) acryloxy and (meth) acrylamido monomers 2-(methacryloxy) ethane sulfonic acid, 2-(acrylamido)-2-methyl propane sulfonic acid, N-(2-methacryloxy ethyl)-N,N-dimethyl amine, N-(3-methacrylamido-propyl)-N,N-dialkyl-N-methyl ammonium halides and N-(2-methacryloxy ethyl)-N,N,N-trimethyl ammonium chloride. Such monomers may be mixed with a minor amount of crosslinking monomer such as divinyl benzene, ethylene glycol dimethacrylate and trimethylol propane trimethacrylate. Preferably any amine moieties in the resulting interpolymer membranes are converted to quaternary ammonium groups.

2 Claims, No Drawings

HIGH IONIC CONDUCTANCE ION EXCHANGE MEMBRANES AND THEIR PREPARATION

This application is a continuation-in-part of application Ser. No.: 08/029,491 filed Mar. 11, 1993 which in turn is a continuation-in-part of application Ser. No.: 07/656,382 filed Feb. 19, 1991 (now abandoned).

This invention relates to organic, polymeric, ion exchange membranes and to methods of making and using them. More particularly, a specific embodiment of this invention is related to ion exchange membranes made from ionogenic polymers and copolymers which have been prepared by having the polymer or monomer exchange places with the non-polymeric, plasticizer molecules of a "plastisol" i.e. a polymer dispersed or solrated in a high boiling point solvent (plasticizer). These monomers are subsequently polymerized or co-polymerized by conventional methods of catalysis using free radical, carbonium ions, or carbanions into polymers within the interstices of the base polymeric chains of the original plastisol.

Ion exchange material generally require not only chemical stability and high exchange capacity but also a variety of mechanical properties such as flexibility, elasticity, toughness and most important, freedom from internal stress and strain. These properties are particularly important for ion exchange materials in the form of membranes, especially when in very thin sheets (and concurrently of the highest conductivity when in equilibration with imbibed water). Such membranes are customarily prepared upon a fabric backing to give handling strength. If the polymeric ion exchange material is not stress resistant at the organic phase polymer-fabric interfaces (especially at the weave junction) the ion exchange membrane will leak severely at these junctures during usage in saline solutions. This is a major cause of failure especially when fabric backed ion exchange membranes are very thin (i.e. <10 mils thickness).

It is therefore an object of this invention to provide ion exchange membranes having thicknesses of about one to ten mils and high electrical ion conductance which membranes are not plagued by leakage due to cracks, flaws, holes, etc. A further object is to have membranes of both high chemical efficiency (i.e. permselectivity) and very high mechanical durability during usage in saline solutions, especially when using the process of electrodialysis.

The ion exchange material of this invention (particularly its membrane form) has both improved chemical efficiency and mechanical properties. This is achieved by exchanging selected monomers or polymers or other combinations of selected ionogenic or potentially ionogenic materials (which have the desired properties) with the imbibed, dispersed and sometimes solvated plasticizer contained within the interstices of a plastisol polymer such as flexible polyvinyl chloride.

These ionogenic or potentially ionogenic monomers or polymers are then converted into high molecular weight crosslinked (water insoluble) polymers within the interstices of the base polymer of the original plastisol. This results in a plastic film which contains compatible, ionogenic polymerizates within its infrastructure locus where a high boiling plasticizer, such a tricresyl phosphate or diethyl sebacate once resided. Conversion of these new, potentially ionogenic groups (now caged within the interstices of a base polymer) into ionogenic groups such as organically bound sodium sulfonates, carboxylates, tetraalkyl ammonium halides, trialkyl aryl ammonium halides, tetraaryl phosphonium halides, or trialkyl or aryldialkyl sulfonium halides completes the preparation of the ion exchange membrane of the present invention. The above conversion is not caused by the swelling of the organic base polymer by the potentially ionogenic monomers but is merely the exchange of a plasticizer with potentially ionogenic monomers and with essentially no change in the dimension of the base polymeric film.

It will be shown hereinafter that if the base polymer contains 27% by weight of plasticizer in relation to the exchanged monomers, then it will contain approximately 25–35% by weight (depending upon the density of the original plasticizer) of water and ionogenic polymer in the final water equilibrated ion exchange membrane.

The interstitial polymers contained within the base plastic film are so firmly and intimately held that these components are not leachable when used in any aqueous medium as long as the ionogenic polymerizate itself is not water soluble. Moreover, the physical properties of the novel complex ion exchange material of this invention are substantially those of the inert component selected as the structural base polymer (plasticized) and are almost directly proportional to the relative amount of inert component in the novel ion exchange complex.

The term "potentially ionogenic" includes those monomers capable of being converted into polyelectrolytes by chemical conversions. An example of this is the conversion of the monomer dimethylamino-ethylmethacrylate into an ionogenic monomer or polymer (by the following chemical conversion) after its copolymerization with a small amount of the chemical crosslinker-divinylbenzene, into a polymer located within the interstices of the plastisol base polymer after exchange thereof with the plasticizer of the polymer.

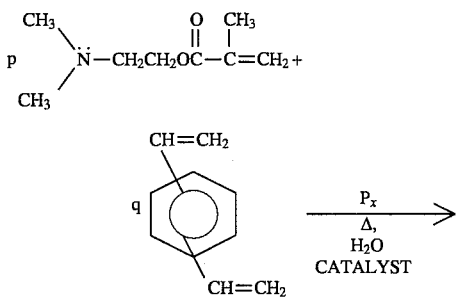

-continued

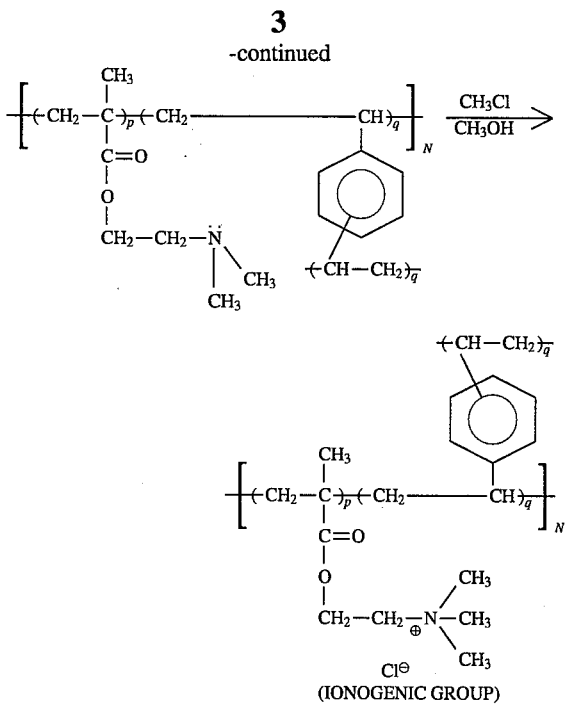

$P_x$ = POLYMERIZATION REACTION
$\Delta$ = HEAT APPLIED

The ion exchange materials of this invention are in the solid phase at room temperature and pressure. They may be used as sheets (preferably) or tubes or other molded or cast shapes such as beads, coupons, pellets etc. When in the form of membranes, they principally find use in dialysis cells and in their finely divided form are used in standard ion exchange columns. They are suitable for all known ion exchange purposes such as water demineralization, collection or concentration of radio active material or heavy metals and in the purification of protein, sugar solutions etc. Additionally ion exchange membranes prepared according to this invention can be stored or transported in the dry state, which is an important commercial advantage.

The invention embodies a chemically inert, organic polymer which defines (after conversion to any ion exchange membrane of which several examples will be given) the desirable mechanical properties to the ion exchange material as a "plastisol" blend. Here, the original plasticizer (giving flexibility due to its dispersion in the original plastic sheet) has been removed and replaced by ion exchange polymeric materials which now fill the interstitial voids of the film. Imbibition of water into the system (which is a natural phenomenon when ion exchange polyelectrolytes are exposed to water) completes the formation of an ion exchange membrane.

In describing the base polymer (plasticized) as inert, the word "inert" is here used in the sense of being a material that is unreactive to free ions and substantially water insoluble whereas in contrast an "active" material will form a polyelectrolyte. The "inert" polymer is the organizing element of the resulting ion exchange material. It is a porous base film having pre-selected geometries and having pores of dimensions (10–30 Å) that reflect the sizes of the high boiling point plasticizer molecules used to prepare the original "plastisol". These pore sizes are essentially unchanged during the conversion to ion-exchange membranes.

The membranes remain transparent during the formation of the polyelectrolytes (crosslinked) in these pores. This transparency will persist even when the polyelectrolytes are equilibrated with water to form the ion exchange membrane. If the base film pores had expanded beyond the 10–30 Å sizes, light would be diffracted while passing through the membrane and the membrane would become opaque. This does not occur.

The stability of the aqueous ion exchange structure can be enhanced by crosslinkages. It is not necessary for the base film to be crosslinked, although post crosslinking of the base film would be tolerable should it occur during the polymerization of the imbibed monomers while creating the ion exchange portion of the mixture. The polymerization and crosslinking of the "ionogenic" (or potentially ionogenic) monomers used to create the polyelectrolyte portion of the ion exchange membrane are effected by free radical catalysts, Lewis acid catalysts, or carbanion catalysts. Ionizing radiation (i.e. high energy radiation) is not normally used in the embodiment of this invention.

The inert polymer, which forms the base film, is preferably a vinyl polymer or copolymer. Various combinations of inert polymers and polymeric precursors may be copolymerized and the invention includes these either singly or in combination. Polyvinyl chloride and polyvinylidene fluoride are preferred inert materials, being capable of being plasticized with many different high boiling point organic materials such as triethylphosphate, di-octyl phthalate, diethyl sebacate, tricresyl phosphate, tri-n-butyl citrate, dimethyl acetamide and countless other high boiling point esters too numerous to mention here. Polyvinyl bromide, polyvinyl fluoride and polyvinylidene chloride may also be used when properly plasticized with high boiling point esters. Polymers of acrylonitrile, low density polyethylene, styrene-butadiene copolymer, alkyl methacrylates, and alkyl acrylates if properly plasticized would work equally as well.

Copolymers of vinyl chloride-vinyl acetate, vinyl chloride-vinyl alcohol, ethylene-propylene, vinylidene fluoride-chlorotrifluoro ethylene, natural and synthetic rubbers would also be useful base films when in the form of plastisols or organisols.

The active monomer materials which are exchanged for the high boiling point plasticizers, and thereafter polymerized within the interstices of the base films may include styrene, alkyl styrenes, haloalkyl styrenes (e.g. chloromethyl styrene or bromomethyl styrene), esters of styrene sulfonic acid, salts of styrene sulfonic acid, 2 sulfoethyl methacrylate, acrylamidomethylpropyl sulfonic acid, divinyl benzene, ethyleneglycoldimethacrylate, and trimethylolpropane-tri-methacrylate. Other types of vinyl monomers also furnish very satisfactory ion exchange precursors such as vinyl pyridines, vinyl piperidines, vinyl lutidine, vinyl carbazole, acrylic acid, methacrylic acid, dimethylaminoethylmethacrylate, dimethylaminopropylmethacrylamide, methyl chloride quaternized dimethylaminoethylmethacrylate, methyl chloride quaternized dimethylaminopropylmethacrylamide, other N,N-dialkyl propylaminomethacrylamides and methyl chloride quaternization products of the same.

The polymerizates created by chemical polymerization or copolymerization within the interstices of the base films are treated by various chemical methods to produce ion exchange groups thereon if none already existed during the monomer's polymerization step.

For example cation exchange material or membranes can be produced by sulfonation of the phenyl groups of the polymerized imbibed materials. This procedure is easily performed by treatment with chlorosulfonic acid, oleums, concentrated sulfuric acid or solubilized sulfurtrioxide. Amination by a tertiary amine on the chloromethyl group attached to polymerized styrene (or any other aromatic polymerizate) produces excellent aromatic resins having substituted quaternary ammonium chlorides. In a preferred mode, aliphatic tertiary amine polymerizates may be easily converted to their quaternary ammonium halides by direct reaction (at atmospheric pressure) with methyl chloride in a protic solvent such as methyl alcohol. In some cases, active ionic groups are covalently bonded to monomers or crosslinkers attached to the imbibed monomers which are subsequently converted directly into thermoplastic or thermoset ionic polymers. These, of course, need no further chemical conversions.

Another case for conversion of imbibed polymerizates into ion exchange materials lies in the acidification of amine polymers prepared from vinyl pyridine, vinyl piperidine, vinyl lutidine, N,N-dialkyl amino propyl methacrylamides, N,N-dialkyl amino ethyl methacrylates and the like.

According to the method of this invention, a solid polymeric sheet which has been cast or extruded with a fixed percentage of a high boiling point ester plasticizer is fully immersed or otherwise contacted with a plethora of "ionogenic" (or potentially "ionogenic") monomers along with a small fraction of a crosslinking bifunctional monomer such as divinyl benzene. After equilibration, (whence the monomers have replaced a greater part of the plasticizer) the film is removed from the monomer bath and wiped surface dry with a towel or a rubber squeege. The film is then immersed into a second bath of ionogenic (or potentially "ionogenic") monomers as before except that in this second bath there is dissolved from about 0.5% to 2% of a vinyl monomer catalyst. The film is again removed and wiped clean of surface monomers, sandwiched between glass plates, polyester sheets or fluorocarbon coated metal plates and the sandwich heated to 65°–90° C. for a period of time of about one to four hours in an explosion proof oven. The sandwich is cooled, the plates removed, and the resulting plastic sheet, now filled with polymerized infused monomers is converted to an ion exchange membrane by methods described above.

During the conversions (which may take place with any combinations of monomers and sometimes even with diluent present), there is essentially no swelling of the base polymeric film by the monomers especially where the exchanged monomers are not effective solvents or swellants of the base film.

Prior to disclosing specific examples of the invention, several observations should be pointed out:

1. There is no reaction between the imbibed monomers and the base polymeric plastic.
2. If the plastisol contains a certain amount of plasticizer, the final ionogenic polymerizate will be of a substantially same amount.
3. Only base films having a plethora of amorphous zones and capable of adding plasticizer to these zones will be effective base films for preparing "exchange of moiety" type ion exchange membranes.
4. The interstial pores are in the molecular size range as noted by translucence of the finished ion exchange membrane. (i.e. these are not blends which depend upon polymer compatibility).
5. Infused monomers will polymerize in situ within the pores of the host polymer even if the host polymer and the infused polymers are incompatible when blended externally. (i.e. this allows incompatible polymer combinations to co-exist and be converted to clear, translucent, ion exchange membranes).
6. Protic (water loving) monomer combinations can be successfully blended into host films having a highly non-polar nature and the finished ion exchange membranes will be compatible.
7. Combinations of monomers, ionomers, crosslinkers and diluents usually not fully soluble with co-solutions of base polymer are possible which otherwise could never be blendable with the base film polymer using solvent casting.
8. Ion exchange materials having an all aliphatic structure can easily be prepared. This is important for the preparation of fouling resistant anion exchange membranes for use in the electrodialysis of surface waters.
9. Ion exchange materials having a high degree of resistivity to chlorine can be prepared via the preparation of "ionogenic" methacrylamides and "ionogenic" methacrylate esters usually crosslinked with divinyl benzene within the plasticizer pore structure of a polyvinylidene fluoride or other base film which is resistant to chlorine attack.
10. Ion exchange materials having a high degree of resistance to high concentrations of hydroxide ions can be prepared via preparation of "ionogenic" methacrylamides containing quaternary ammonium hydroxide groups copolymerized with divinyl benzene within the pores of a base film such as polyvinyl chloride film.

The invention is further described and illustrated by the following detailed examples:

EXAMPLE #1

In a preferred example of a method according to this invention, a precast plastisol film 5 mils thick (0.013 centimeters) of polyvinyl chloride (PVC) containing 30 wgt % of the plasticizer diethyl sebacate is immersed in a preprepared bath of the following composition:

96 parts dimethylaminopropylmethacrylamide(DMAPMA)

4 parts 80% divinyl benzene(DVB)/20% ethyl vinyl benzene

The film was allowed to equilibrate for a period of sixteen hours, it was removed from the monomer bath and wiped clean on both surfaces of the film by an absorbent towel material. The PVC sheet was then immersed completely into a second bath containing the following materials:

96 parts dimethylaminopropylmethacrylamide 4 parts—80% divinyl benzene/20% ethyl vinyl benzene 1 part of azo bis isovaleronitrile catalyst The film was allowed to equilibrate for a four hour period, removed and again wiped free of monomers and catalysts and placed between two 3 mil sheets of polyethylene glycol terephthalate copolymer which in turn was placed between two glass plates (~3/16" thick each) the whole sandwich of which was placed into an explosion proof, flo-through thermostatted oven at 85° C. for a period of three hours. This step effectively polymerized occluded monomers within the interstitial structure of the base film. After cooling, the PVC/polymerizate sheet was removed from the sandwich. The film was transparent and stiff but retained its handling strength. A membrane portion was cut from the sheet and immersed in water for one hour. The membrane had a resistivity of 870 ohm-cm$^2$ and a thickness of 0.014 cm(5.5 mils). The resistivity was measured between platinum black on platinum electrodes at 1 kilo Hertz.(General Radio Bridge). This membrane sample was then immersed into a 0.5N hydrochloric acid solution for one hour, rinsed three times in ultrapure water and finally equilibrated with a solution of 0.01N sodium chloride for 30 minutes. Its resistivity now measured 5.5 ohm-cm², which showed that the acid had converted the polymerized and crosslinked dimethylaminopropylmethacrylamide into an amine hydrochloride salt which was an effective weak base ion exchange membrane. The resulting membrane was found to be flexible, strong, and leak free.

The following diagramatic illustrations show the chemical progression in the preparation of this weak base anion exchange membrane:

The ion exchange capacity of the resulting weak base anion exchange membrane was found to be 1.26 meq.Cl⁻/gram dry film and a water content of 29.2% on a wet basis i.e.

$$\% H_2O = \frac{\text{Wgt imbibed } H_2O}{\text{Wgt Wet film}} \times 100$$

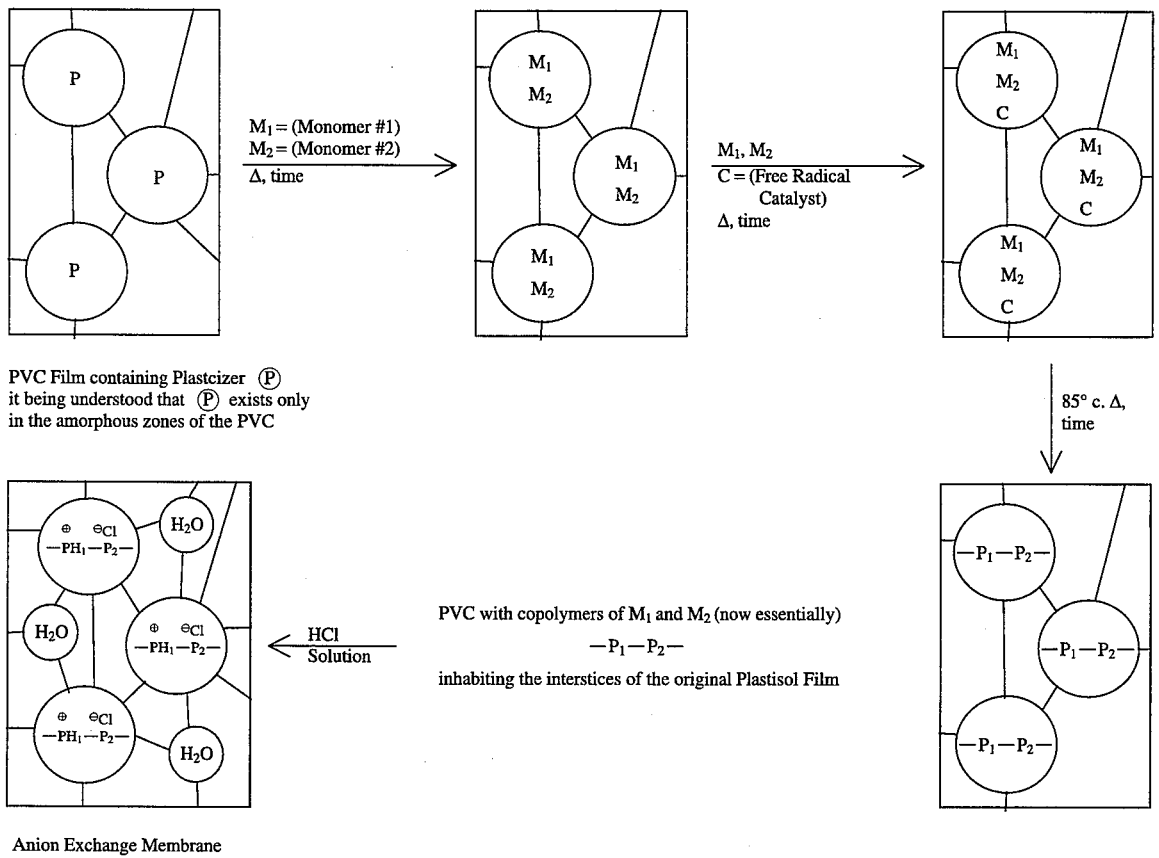

Let $P_1$=the DMAPMA portion of the polymer and $P_2$ the DVB portion. The weak base anion exchange membrane of this example results from reacting the $P_1$ portion with a hydrochloric acid solution as follows:

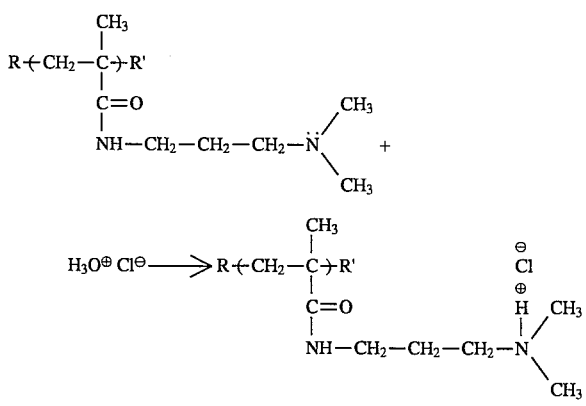

EXAMPLE #2

The remaining portion of the Example #1 polymerizate was placed in a bath of saturated methyl chloride in methyl alcohol for 16 hours to chemically convert this tertiary amine copolymer into a quaternary ammonium halide copolymer.

The film was immersed in water for 30 min, then equilibrated in 0.01N NaCl to give the following results:

Ion Exchange Capacity=2.50 meq/dry gram resin
Resistivity=3.0 ohm-cm²(1 kHz)
Thickness=0.028 cm.
Water Content=36.7%

The resulting film was strong, flexible and free of leakage.

EXAMPLE #3

The same sequence of preparation was carried out as in example #1, except that the plasticizer content of the base plastisol film of plasticized polyvinyl chloride which was used contained only 20% plasticizer. The final membrane had the following properties after methylation according to Example #2:

Ion Exchange Capacity=1.35 Milliequivalents/dry gram resin

Resistivity in 0.01N NaCl(1 kHz)=7.1 ohm-cm$^2$

Thickness=0.028 cm

Water Content=24.2%

EXAMPLE #4

The same preparative method was used as in example #1 except that the plasticizer content of the starting film was 0%. The final film had the following properties after methylation for 16 hours:

Ion Exchange Capacity=<0.02 Milliequivalents/dry gram resin

Resistivity in 0.01N NaCl(1 kHz)>2000 ohm-cm$^2$

Thickness=0.015 cm

Water Content=None found

This example shows that the combination of monomers (96% dimethylaminopropylmethacrylamide-4% divinylbenzene) does not have the ability to penetrate unplasticized polyvinyl chloride upon mixing even at the high temperature used in this example, 60° C.

EXAMPLE #5

A 4"×4" sheet of 8 mil polyvinyl chloride having a 30% by weight content of di-octyl phthalate plasticizer, was carried through the same preparative path as described in example #1. After overnight methylation according to example #2 the final film had the following properties:

Thickness=0.030 cm

Ion Exchange Capacity=1.22 Milliquivalents/dry gram resin

Resistivity=5.7 ohm-cm$^2$ in 0.01N NaCl(1 kHZ)

Water Content=32.0%

EXAMPLE #6

A sample of the membrane prepared in Example #5 was immersed in 100 ml of 0.25N NaOH (pH=13.6) for a period of 48 hours, was washed twice with 2N NaCl for 30 minutes and then washed free of sodium chloride in running water. When equilibrated in 0.01N NaCl its resistivity measured 5.5 ohm-cm$^2$.

This example shows that this membrane is stable to high concentrations of hydroxide ion.

EXAMPLE #7

The membrane of Example #2 was die cut into three pieces of (3"×3/4") and each placed into a 0.2% sodium hypochlorite solution (100 ml) adjusted to the following pH values using 2N HCl soln:

Soln #1—pH=8.0±0.1

Soln #2—pH=6.0±0.1

Soln #3—pH=4.0±0.1

After 30 days, each membrane sample was removed, washed with water and finally equilibrated with 0.01N sodium chloride solution. Resistivities were measured and the physical conditions of the membrane films noted.

The membrane strip from solution #1 showed little physical deterioration and even more important its resistivity measured a small change of 3.6 ohm-cm$^2$ from the original resistivity of 3.0 ohm-cm$^2$. This example shows that membranes prepared by the polymerization of dimethylaminopropylmethacrylamide-divinyl benzene copolymer within the interstices of plasticized (30%) polyvinyl chloride and its subsequent methylation to yield a quaternary ammonium chloride membrane can resist the action of chlorine (as hypochlorite) in the 2000 ppm feed range at a pH of 8.0±0.1 for a period of 30 days. Such membranes would be useful in the desalting of waters which have been pretreated with chlorine.

The membrane strip from solution #2 had physical damage in terms of a badly discolored film and some brittleness. However, its resistivity after conversion to its chloride ion form after an extensive water rinsing and equilibration in 0.01N NaCl, was a respectable 3.5 to 4.2 ohm-cm$^2$. We can therefore conclude that the principal damage to this specimen was to the base polyvinyl chloride film.

The third strip was so badly degraded in terms of discoloration and brittleness that it was not possible to measure resistivity. In conclusion, this example shows that the membrane of Example #2 is somewhat stable to chlorine(at the 0.2% bleach level) at pH values of 8.0 and above and that membrane failure at the lower pH- chlorine exposures (at the 2000 ppm level) are because of the base PVC film.

EXAMPLE #8

An eight mil film of polyvinylidene fluoride (5"×5"), plasticized with nineteen weight percent of the high boiling point liquid dimethylacetamide was equilibrated with a monomer mixture of 98% monostyrene—2% divinyl benzene, the former being a pure monomer while the latter a 80 wgt % divinyl benzene −20% ethyl vinyl benzene mixture into which was dissolved 1% by weight of the catalyst benzoyl peroxide. The film was removed from the liquid mixture and wiped free of excess monomers-catalyst whence it was sandwiched between two 3 mil polyethyleneterephthalate sheets which were in turn sandwiched between two 3/16" glass plates. The whole sandwich was placed into an 85° C. explosion proof oven and heated at this temperature for a period of two hours. After cooling, the glass and polyester film was removed whence a film of 9 mils was obtained which was transparent, strong and still flexible.

This film (approximately 5"×5" in area) was cut into three 2-½" square pieces. Two pieces were set aside while the third piece was immersed in a solution of chloroform containing 10 wgt % of chlorosulfonic acid for a period of four hours and then neutralized in tap water. The membrane was allowed to remain in water until the ochre color is removed.

The membrane was rinsed free of mineral acids and then immersed in water at 65° C.±5° C. for a period of 16 hours. The membrane was then placed into a fresh 80° C. water bath whence it is hydrolyzed for 30 minutes. The membrane was equilibrated with a saturated sodium bicarbonate solution for 2 hrs then rinsed free of bicarbonate salt.

The membrane found to have the following properties:

Capacity=0.94 meq/dry grams resin

%H$_2$O=15.2%

Resistivity=22.6 ohm-cm$^2$ 0.01N NaCl, 1 kHz

EXAMPLE #9

The same procedure was carried out as in Example #8 on a second piece except this second square piece was re-equilibrated a second time in the styrene-divinyl benzene solution (with catalyst) for four hours, reassembled in the polyester glass sandwich and heated at 85° C. for 2 hours.

The thickness of this doubly imbibed sheet had increased from 9 to 10 mils and its properties after similar sulfonation treatment was as follows:

Capacity=1.19 meq/dgr
%$H_2O$=23.2%
Resistivity=11.7 ohm-$cm^2$
0.01N NaCl; 1 kHz The membrane was strong, flexible, transparent, and leak free.

EXAMPLE #10

The last remaining piece was given three separate styrene-DVB infusion and polymerization steps with subsequent sulfonation and neutralization as carried out in Examples #8 and #9. The membrane properties follow:

Thickness=11.0 mils
Capacity=1.33 meq/dgr
%$H_2O$=30.0%
Resistivity=8.1 ohm-$cm^2$
(0.01N NaCl; 1 kHz)

The membrane was strong, leak free and flexible but only when wet.

EXAMPLE #11

A 5"×5"×8 mil thick polyvinylidene fluoride sheet, totally devoid of plasticizer and slightly opaque was placed into a solution of monostyrene 98% −2% divinyl benzene into which was dissolved 1% benzoyl peroxide.

The solution was carefully brought up to 60° C. and the polyvinylidene fluoride film equilibrated for a one hour period. The film was removed from the hot styrene-DVB bath and the excess monomers-catalysts wiped from both surfaces. The film was placed between two 3 mil films of polyethylene terphthalate and then between two 3/16" pieces of glass and the sandwich heated for 4 hours at 85° C. The film was removed from the sandwich and found to still be only 8 mils thick. A 2-½" sq. inch section of the film was placed into a 10 wgt% chlorosulfonic acid in chloroform bath for a period of 4 hours. After neutralization of the film with sodium bicarbonate and equilibration with 2N NaCl followed by 0.01N NaCl, the following properties were found:

Capacity=<0.1 meq/dgr
%$H_2O$=<2%
Resistivity=>500 ohm-$cm^2$
0.01N NaCl; 1 kHz

In fact it was determined that no styrene or DVB had been successfully imbibed into the unplasticized polyvinylidene fluoride film.

EXAMPLE #12

A plastisol sheet of polyvinylidene fluoride (6.5 mil thick) plasticized with 21% triethylphosphate was equilibrated in a bath mixture containing 98 wgt % of vinyl benzyl chloride −2% of 80% divinyl benzene into which were contained 1% of the catalyst benzoyl peroxide. The bath was brought to a temperature of 50°–55° C. for a period of 15 minutes whence a 3"×3" sheet was removed from the bath and wiped free of monomers. The sheet of polyvinylidene fluoride saturated with monomers-catalyst was sandwiched between two 3 mil polyethylene terphthalate sheets which in turn were placed between two 3/16" glass plates. The sandwich was heated to 85° C. for four hours whence it was cooled and a 3"×¾" piece was placed into a methanolic solution of 2N trimethyl amine for 16 hours.

The membrane was removed from the amination bath and plunged into a 2N HCl bath and then rinsed free of all salts with tap water. The membrane had the following properties:

Thickness:=7.8 mils
Capacity:=1.21 meq/dgr
%$H_2O$=25.9%
Resistivity=10.6 ohm-$cm^2$
0.01N NaCl; 1 kHz The membrane was strong, flexible, and leak free.

EXAMPLE #13

A plastisol sheet of very flexible polyvinylidene fluoride (5.8 mils in thickness) plasticized with 28 wgt % of triethylphosphate was equilibrated with the same monomer-catalyst mixture as described in Example #12 and converted to a finished ion exchange membrane by the same amination step. Properties were as follows:

Thickness:=8.0 mils
Capacity:=1.44 meq/dgr
%$H_2O$:=33.7%
Resistivity:=4.8 ohm-$cm^2$ The resulting membrane was strong, leak free, and flexible when water equilibrated.

EXAMPLE #14

A 3"×3" plastisol film of polyvinylidene fluoride (6.8 mils thick) plasticized with 28% triethylphosphate was equilibrated in a mixture of 98% dimethylaminopropylmethacrylamide −2%(80 fraction)divinyl benzene −1% azo catalyst and the anion exchange membrane prepared by the same route as Examples #1 and #2.

Properties of the finished film were as follows:

Thickness=8.4 mils
Capacity=1.35 meq/dgr
%$H_2O$=32.2%
Resistivity=4.2 ohm-$cm^2$ The membrane was strong, leak free, and flexible when water equilibrated.

EXAMPLE #15

Three samples (3"×¾") of the films prepared in Example #14 were placed in different solutions of 0.2% sodium hypochlorite solution at three different pH's as was carried out in Example #7. The initial resistivities of the samples were about 4.2 ohm-$cm^2$.

After 30 days of testing, each sample showed only slight signs of degradation since their resistivities had not increased materially.

|  | ppm Sodium Hypochlorite | Final Resistivity ohm-$cm^2$ 1 khz |
|---|---|---|
| Sample #1 pH = 8.0 ± 0.1 | 2000 | 4.8 |
| Sample #2 pH = 6.0 ± 0.1 | 2000 | 5.1 |
| Sample #3 pH = 4.0 ± 0.1 | 2000 | 6.0 |

The results show that an ion exchange membrane prepared by polymerizing a copolymer mixture of 98 wgt% dimethylaminopropyl-methyacrylamide-2% divinyl benzene within the pores of a 28% plasticized polyvinylidene fluoride film will yield a polymeric anion exchange membrane (after overnight methylation with methyl chloride) having good to adequate resistance to 2000 ppm bleach over a 30 day period.

EXAMPLE #16

A sample of the same membrane as prepared in Example #14 was placed in 0.1N NaOH over a 30 day period. After removal and reconversion back to the chloride form, the resistivity was once again found to be 4.0 to 4.5 ohm-cm$^2$ in 0.01N NaCl at 1 kilo Hertz. This anion exchange membrane was found to be stable for 30 days at a pH≡13.

EXAMPLE #17

A cast film of polyvinyl chloride, (5 mils thickness) plasticized with a 30% ester plasticizer was equilibrated twice (as described in Example #1) with an 80% aqueous solution of the quaternized chloride salt of the formula:

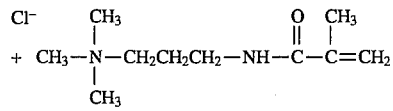

which was admixed with 1% vazo 67(Azobisisovaleronitrile).

The film was made into a polyester, glass sandwich (as described in Example #1) and heated to 85° C. for 4 hours. After developing the film in water, no capacity or conductivity was found in the finished 20 sample. It appears that the quaternary ammonium monomer failed to enter the plastisol matrix.

While the invention has been described with respect to certain exemplifications and embodiments thereof, the scope is not to be so limited except as in the claims appended hereto.

I claim:

1. An interpolymer strong base or strong acid ion exchange membrane comprising a copolymerizate of one or more ethylenically polymerizable monomers selected from the group consisting of 2-sulfoethyl methacrylate, acrylamidomethyl propyl sulfonic acid, dimethyl aminoethyl methacrylate, N,N-dialkyl aminopropyl methacrylamides, N-(methacrylamido propyl)-N,N-dialkyl-N-methyl ammonium halides, methacryloxyethyltrimethyl ammonium chloride and mixtures thereof and one or more ethylenically polymerizable monomers selected from the group consisting of divinyl benzene, ethylene glycol dimethacrylate and trimethylolpropane trimethacrylate, said copolymerizate dispersed in a film comprising one or more polymers selected from the group consisting of polyvinyl chloride, polyvinylidene fluoride, polyvinyl bromide, polyvinyl fluoride, polyvinylidene chloride, polyacrylonitrile, polyethylene, styrene-butadiene copolymers, polyalkyl methacrylates, polyalkyl acrylates, vinyl chloride-vinyl acetate copolymers, vinyl chloride-vinyl alcohol copolymers, ethylene-propylene copolymers, vinylidene fluoride-chlorotrifluoroethylene copolymers, natural and synthetic rubbers and mixtures thereof, any tertiary amine moieties in said polymerizate having been converted at least in part to quarternary ammonium moieties.

2. An interpolymer strong base or strong acid ion exchange membrane according to claim 1 prepared:

a) from:

a liquid comprising one or more ethylenically polymerizable monomers selected from the group consisting of 2-sulfoethyl methacrylate, acrylamidomethylpropyl sulfonic acid, dimethylaminoethyl methacrylate, N,N-dialkylaminopropylmethacrylamide, N-(methacrylamidopropyl)-N,N-dialkyl-N-methyl ammonium halides, methacryloxyethyltrimethyl ammonium chloride and mixtures thereof said liquid also comprising one or more ethylenically polymerizable monomers selected from the group consisting of divinyl benzene, ethylene glycol dimethacrylate and trimethylol propane trimethacrylate and mixtures thereof and from:

a solid comprising one or more polymers comprising ethylenic monomers which solid when it has less than the below mentioned predetermined amount of one or more plasticizers therein absorbs by contact with said liquid less than the desired amount of said liquid, said solid containing an amount of said one or more plasticizers predetermined to result in absorption of substantially the above mentioned desired amount of said liquid when at least part of at least one of said plasticizers is extracted from said solid by said liquid; and b) by a process comprising contacting with said liquid said solid containing said predetermined amount of said one or more plasticizers thereby extracting said at least part of at least one of said plasticizers by means of said liquid and simultaneously replacing said extracted plasticizer by absorbing into said solid substantially the above mentioned desired amount of said liquid; thereafter polymerizing at least in part at least one of said polymerizable monomers in said liquid absorbed in said solid thereby forming a body comprising said solid and the polymers of said at least one of said polymerizable monomers;

and subsequently converting any tertiary amine moities in said last mentioned polymers at least in part to quaternary ammonium moieties.

* * * * *